May 1, 1928.
J. R. MACK
1,668,080
APPARATUS FOR SPRAYING PLASTIC OR COMMINUTED MATERIALS
Filed Aug. 12, 1926     2 Sheets-Sheet 1
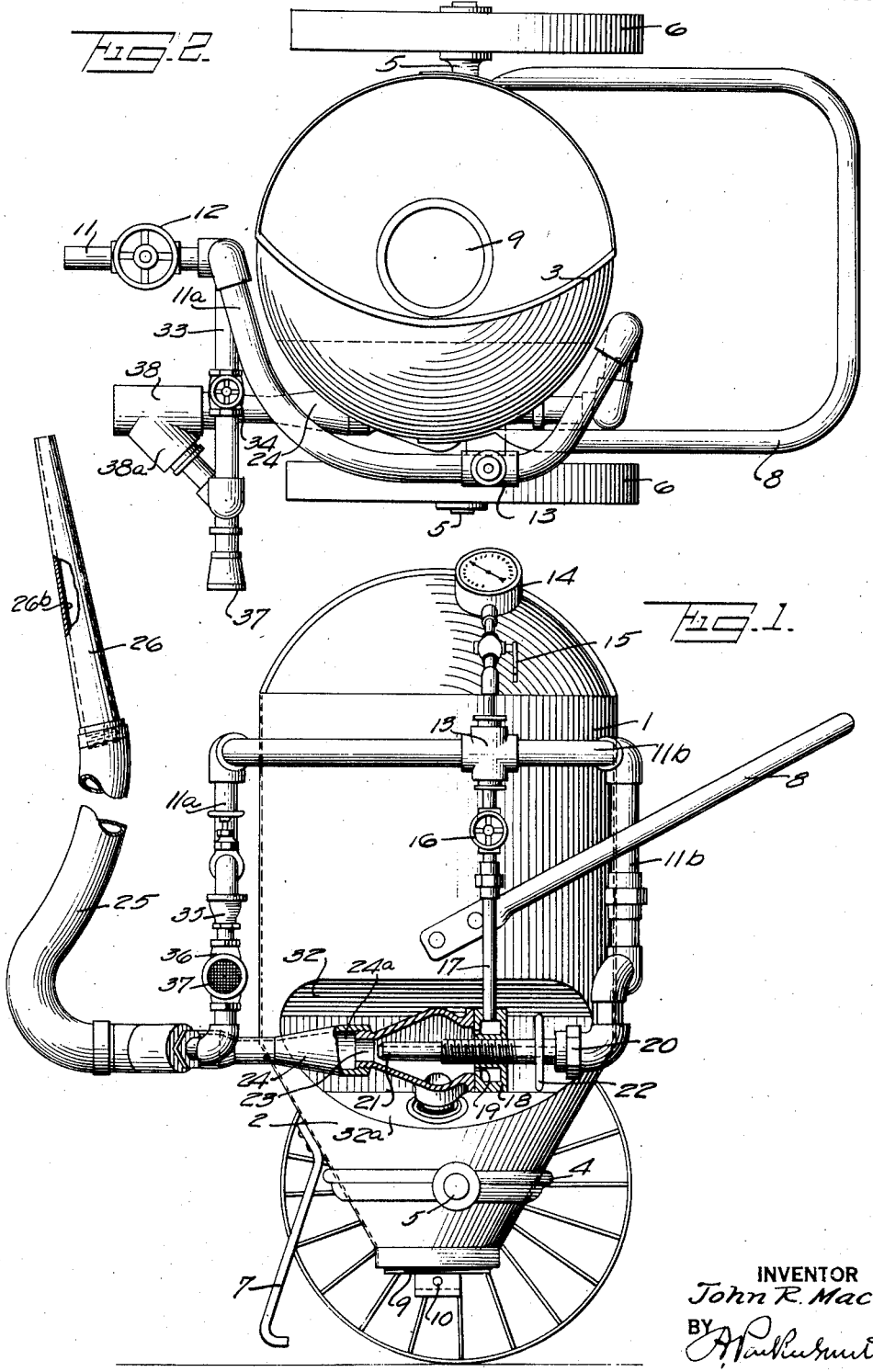
INVENTOR
John R. Mack
BY
ATTORNEY May 1, 1928.  
J. R. MACK  
1,668,080  
APPARATUS FOR SPRAYING PLASTIC OR COMMINUTED MATERIALS  
Filed Aug. 12, 1926  
2 Sheets-Sheet 2

INVENTOR  
John R. Mack  
BY  
ATTORNEY

Patented May 1, 1928.

1,668,080

UNITED STATES PATENT OFFICE.

JOHN RODNEY MACK, OF CALDWELL, NEW JERSEY, ASSIGNOR TO QUIGLEY FURNACE SPECIALTIES COMPANY, INC., A CORPORATION OF NEW YORK.

APPARATUS FOR SPRAYING PLASTIC OR COMMINUTED MATERIALS.

Application filed August 12, 1926. Serial No. 128,742.

This invention relates generally to apparatus for spraying plastic materials such as stucco, cement, mixtures for refractory linings, &c. against a surface to be coated therewith; or for spraying liquids such as solutions for fumigating, killing insects, or preventing oxidation of surfaces; or for discharging comminuted dry material such as sand in sand blasting, and is more particularly designed to produce a single portable unit capable of adjustment for any one of the above described purposes, and also capable of being operated by steam, compressed air or any other gas or vapor under compression.

In substance the preferred form of apparatus embodying the invention comprises a vertically arranged tank set on wheels, having a special form of ejector apparatus adapted to be operated by various forms of fluid under pressure nested in its side and arranged to draw materials from the bottom of said tank and discharge them through a flexible hose on to the surface to be treated.

The best form of apparatus at present known to me embodying my invention is illustrated in the accompanying two sheets of drawings in which:

Fig. 1 is a side elevation with parts broken away, or shown in section.

Fig. 2 is a plan view with the pressure gauge removed.

Figure 3:
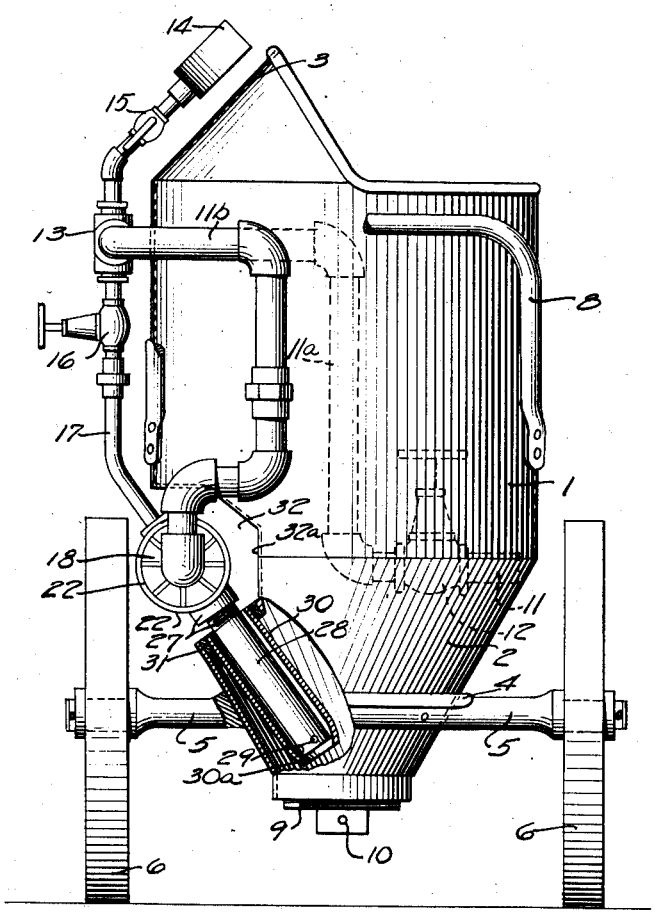
Fig. 3 is a rear elevation with parts broken away, others being shown in section and the pressure fluid supply pipe shown in a different position from that indicated in Figs. 1 and 2.
Figure 4:
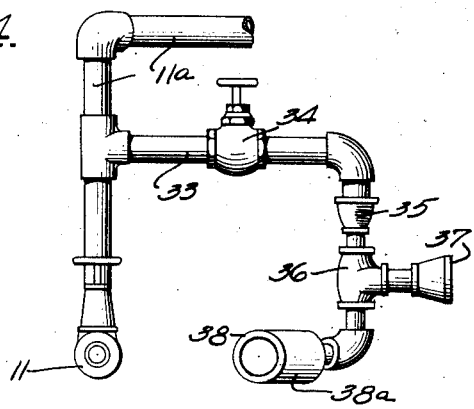
Fig. 4 is a detail of some of the branch piping.

Throughout the drawings like reference characters indicate like parts. 1 is a tank of cylindrical form with conical bottom portion 2 closed by a screw plug 9, equipped with an exterior capstan head 10, by which it may be screwed in and out by means of a capstan bar or special spanner. 3 is an inclined shield covering a portion of the open top of the tank 1, on that side thereof to which the ejector apparatus is attached. 4 is a supporting frame ring in which the conical portion 2 of the tank may rest, said ring being provided with stub axles 5, 5, on either side on which vehicle wheels 6, 6, may be journaled to form a supporting chassis for the tank. 7 is a supporting leg attached to the front of the tank and 8 is a handle projecting from the rear thereof at a height convenient to be grasped by the operator. When the tank is in an approximately vertical position, a perpendicular line dropped from its center of gravity will pass between the axis of axles 5 and the lower end of leg 7, so that whenever the operator lets go of handle 8, the apparatus will then come to rest supported on wheel 6 and the leg 7. When the operator desires to transport the apparatus, he tips it back by means of handle 8 so that leg 7 will clear the ground, as shown in Fig. 1, and pushes or pulls it about to the desired new location.

11 is a pipe for steam or compressed air supply equipped with a cut-off valve 12 and extending beyond said valve by section 11$^a$ to the four-ported fitting 13. The pressure guage 14 is connected to the upper portion of this fitting 13 by a pipe which is equipped with the shut-off valve 15, and the lower port of the fitting is connected to pipe 17 equipped with valve 16, said pipe extending to the hollow casting 18 which forms the back of the vacuum chamber of the main ejector apparatus. Steam or compressed air is supplied to this ejector apparatus through pipe 11$^b$ connected to the right hand port of fitting 13, and transmitting the pressure fluid to the nozzle 21 of the ejector apparatus, being connected thereto by the union 20. Nozzle 21 is threaded into casting 18 and equipped with hand wheel 22 so that by loosening up union 20 the nozzle may be advanced or retracted in relation to the discharge port of the ejector 23. The hollow casting 18 is provided in one face with a plurality of jet openings 19 discharging into the vacuum chamber of ejector 23. A conical nozzle 24 screwed on over the discharge end of the ejector 23 forms an expansion chamber 24$^a$ for the gases or vapors as they are discharged into said nozzle 24. A flexible hose 25 is connected to the main portion of angle union 38, one branch of which is connected to the hose nozzle 24, and 26 is a tapered nozzle for said hose composed of any suitable fabric which is a non-conductor of heat, such as one having an outer body of rubber and textile constituents, and a lining 26$^b$ of pure rubber.

As shown, the ejector apparatus 23 is nested in a cavity 32 formed by a reentrant portion 32$^a$ of the wall of tank 1 on the same side of said tank as the shield 3 is located. The suction inlet 27 of this ejector apparatus is connected by pipe 28 screwed into it, with the lower portion of the interior of the conical bottom 2 of tank 1. Preferably the lower end of pipe 28 is provided with perforations 29. A thimble 30 is screwed into the ring 31, which latter is welded on to one section of the reentrant portion 32ª of the tank wall. Preferably the inner end of thimble 30 is contracted slightly about the end of pipe 28 so as to render the inlet to thimble 30 of a diameter substantially the same as that of pipe 28.

A branch 33 from pressure pipe 11ª is provided with a cut-off valve 34 and connected by reducing union 35 to a small air injector 36, which has a suction inlet 37 opening to the atmosphere. The discharge nozzle of this air injector is connected to the branch 38ª of the angle union 38.

In using my invention, the material to be sprayed, whether liquid, plastic or dry, is deposited in the tank 1, and when valve 12 is open (valve 16 being closed) the pressure fluid will be discharged through nozzle 21 out through the discharge orifice of ejector 23 into the expansion chamber 24ª, sucking up through pipe 28 a portion of the contents of tank 1 and discharging the mixture through hose 25 and nozzle 26. If steam is used for the pressure fluid the valve 34 is also open, with the result that the air injector 36 is put into operation and discharges a jet of cold air through branch 38ª into the angle union 38, condensing the steam used in both injectors so that the operator can clearly see the jet of material issuing from nozzle 26, and also the surface against which it is being projected. If compressed air is needed, valve 34 may be kept closed.

When plastic materials, especially those of a cementitious character, are being used, the same are liable to deposit on the nozzle 21 or inner surface of the walls of the vacuum chamber in ejector 23 and clog up the apparatus. In such case the valve 16 should be open, discharging a plurality of jets of pressure fluid through perforations 19 along nozzle 21 and against the walls of the vacuum chamber, cleaning off and expelling through the hose 25 any accumulated material.

The annular space between the inlet pipe 28 for the ejector and the thimble 30 forms an inlet for air which will mingle with and break up the material being sucked in to pipe 28 from the bottom of the tank 1. When dry materials are used this is necessary to permit the ejector to work successfully and it is helpful when plastic or liquid materials are used. This action of the entrant air is further improved by the perforations 29 in the pipe 28 and by the contraction 30ª of the inner end of thimble 30.

The advantages of my invention comprise its portability, its capacity for use with either compressed air or steam and with materials in liquid, plastic or dry comminuted form, the facility of adjustment and cleaning of the ejector, the avoidance of all steam clouds and the protection of the operator from the unbearable heat of the nozzle, when steam is used. This protection is secured by the use of the nozzle 26, made of relatively poor heat conducting material. The apparatus may also be readily removed from its supporting chassis for purposes of storage or repair and, in cases where the stoppage in the discharge line causes a blow back of the pressure fluid into the tank which sometimes produces a geyser-like upward movement of the tank contents, the deflecting shield 3 causes the rising mass to be deflected away from the operator who naturally stands on that side of the machine where the ejector and control valves are located. At the same time the tank top is left sufficiently open to enable the materials to be conveniently shoveled into it from a wheelbarrow or any other form of container.

While I have illustrated and described what I believe to be the best form of apparatus for carrying out the invention, it is evident, of course, that various changes could be made in details of construction and in subordinate features of the apparatus disclosed without departing from the substance of my invention, so long as the underlying principle of operation and the relative arrangement of parts above described are retained.

Having described my invention, I claim:

1. A portable gun for handling plastic materials which comprises, in combination, a tank having a reentrant portion in one side wall, an ejector apparatus mounted and practically enclosed in the cavity so formed, a suction connection from said injector extending down through the lower wall of said cavity nearly to the bottom of the tank interior, and a supporting carrier for said tank having parts closely embracing the side walls thereof, adjacent said ejector apparatus.

2. A combination such as defined in claim 1 in which said tank has a tapering lower portion, and said suction connection projects into said tapering portion.

3. A suction nozzle adapted to be extended through the wall of a tank for withdrawing the contents of said tank which nozzle comprises, in combination, a thimble adapted to be set in the wall of said tank, extending inwardly thereof, and a suction pipe of lesser diameter supported axially of said thimble and extending nearly to the inner end thereof, whereby there is formed an annular air passage from the exterior atmosphere to the inlet end of said suction pipe.

4. A combination such as defined in claim 3 in which said suction pipe is perforated near its inner end.

5. A combination such as defined in claim 3 in which the said thimble has its inner end tapered to a diameter approximately the same as that of the inlet end of said suction pipe.

6. The combination of a tank having an opening in its wall, a thimble set in said opening and extending nearly to the bottom of said tank, and an ejector supported adjacent thereto and having a suction pipe of less diameter than said thimble extending therethrough and approximately to the inner end thereof, whereby air may be drawn in between said pipe and thimble to mingle with the contents of said tank as they are drawn into said suction pipe.

7. A combination such as defined in claim 6 in which said suction pipe is perforated near its inner end.

8. A combination such as defined in claim 6 in which the said thimble has its inner end tapered to a diameter approximately the same as that of the inlet end of said suction pipe.

9. The combination, with a tank, a steam distribution system, and an ejector adapted to be operated by a current of steam having its suction inlet connected to the lower portion of said tank, of means for injecting a current of cold air into the discharge conduit of said ejector comprising an injector having its intake port open to the exterior atmosphere.

10. The combination, with a tank, a steam distribution system, and an ejector adapted to be operated by a current of steam having its suction inlet connected to the lower portion of said tank, of means for injecting a current of cold air into the discharge conduit of said ejector, which said injecting means is also adapted to be operated by a current of steam and comprises an injector having its intake port open to the exterior atmosphere.

11. The combination with an open topped tank, and an ejector apparatus adapted to be operated by fluid under pressure supported at one side of said tank and having its suction inlet opening into the lower portion of the tank interior, of an inwardly inclined shield mounted on and forming a continuation of the tank wall on the same side as that at which said injector is located, whereby a blow-back of the tank contents will be deflected from an operator standing by said ejector apparatus.

12. In an ejector apparatus having a vacuum chamber provided with an outlet, a nozzle extending part way through said chamber and discharging in line with said outlet, and means for supplying fluid under pressure to said nozzle, the combination, with said above described apparatus, of a hollow wall for said chamber, located opposite said outlet and having perforations in its inner portion, and means for intermittently forcing fluid under pressure into the interior of said hollow wall and out through said perforations to scour said chamber walls and nozzle exterior.

13. A combination such as defined in claim 12 in which both said means for supplying fluid under pressure consists of branch pipes from a steam main.

14. A portable spraying gun comprising, in combination, a tank having a tapering lower portion, an ejector apparatus adapted to be operated by fluid pressure nested in the side of said tank at the base of said tapered portion and having its suction inlet connected to the tank interior, a ring shaped support adapted to seat itself on said tapering portion of the tank and provided with outwardly projecting stub axles, and wheels journaled on said axles.

15. The combination, with a tank open at the top and an ejector apparatus adapted to be operated by a fluid under pressure having its suction inlet communicating with the lower portion of the tank interior, of an inwardly and upwardly inclined shield mounted on one side of the upper portion of the tank wall and overhanging a portion of said tank's interior, whereby any blow-back of the tank contents resulting from imperfect operation of said ejector apparatus will be permitted to escape but deflected away from the operator standing by that side of the tank on which said shield is mounted.

JOHN RODNEY MACK.